United States Patent [19]
Hu et al.

[11] Patent Number: 5,959,379
[45] Date of Patent: Sep. 28, 1999

[54] VIBRATION-ISOLATION GROMMET AND MOTOR ASSEMBLY CONTAINING SAME

[75] Inventors: Ziqiang Hu, Niskayuna; Darren Lee Hallman, Clifton Park; Walter John Smith, Ballston Spa, all of N.Y.

[73] Assignee: General Electric Company, Schnectady, N.Y.

[21] Appl. No.: 09/045,198

[22] Filed: Mar. 20, 1998

[51] Int. Cl.[6] .................................................. H02K 5/24
[52] U.S. Cl. ............................... 310/51; 310/43; 310/91; 248/603; 248/604
[58] Field of Search .................................. 310/89, 67 R, 310/43, 51, 91; 248/603, 604, 605, 619, 672

[56] References Cited

U.S. PATENT DOCUMENTS

| | | | |
|---|---|---|---|
| 3,903,443 | 9/1975 | Carlson | 310/91 |
| 4,452,417 | 6/1984 | Krafthefer et al. | 248/604 |
| 4,643,386 | 2/1987 | Chastine | 248/632 |
| 4,849,665 | 7/1989 | Kitamura et al. | 310/68 D |
| 5,203,093 | 4/1993 | Baker | 34/133 F |
| 5,521,447 | 5/1996 | Bertolini et al. | 310/51 |

*Primary Examiner*—Thomas M. Dougherty
*Assistant Examiner*—Tran N Nguyen
*Attorney, Agent, or Firm*—Douglas E. Erickson; Marvin Snyder

[57] ABSTRACT

A motor assembly, such as an evaporator fan for a refrigerator, has a motor, first and second mounting bracket segments, and monolithic and elastomeric first and second grommets. The motor housing has opposingly protruding first and second end bosses. Each grommet includes inner and outer ring portions joined together by spaced-apart and generally-radially-extending spoke portions. The inner ring portion is positioned on the corresponding end boss. The outer ring portion has a hub and a circumferential flange radially projecting form the hub. Each mounting bracket segment has an opening, wherein the hub is positioned in the corresponding opening and wherein the circumferential flange longitudinally abuts the corresponding mounting bracket segment.

13 Claims, 2 Drawing Sheets

# VIBRATION-ISOLATION GROMMET AND MOTOR ASSEMBLY CONTAINING SAME

FIELD OF THE INVENTION

The present invention relates generally to vibration isolation, and more particularly to a vibration-isolation grommet and to a motor assembly containing such a grommet.

BACKGROUND OF THE INVENTION

It is known to use elastomeric grommets to reduce the transmission of vibration, and hence vibration-induced noise, generated by a motor assembly having a motor with a shaft under load. For example, in some household refrigerator-freezers having an evaporator fan, a conventional vibration isolation grommet is employed to reduce vibration and vibration-induced noise generated by the evaporator-fan motor assembly. The evaporator fan motor assembly includes an evaporator-fan motor and a mounting bracket. Typically, the evaporator-fan motor has a motor shaft and has a motor housing with opposing first and second end bosses, and the mounting bracket has first and second segments. The motor shaft protrudes through the first end boss. A first mounting bracket segment has a first opening which receives the first end boss, and a second mounting bracket segment has a second opening which receives the second end boss.

A first vibration-isolation grommet surrounds the first end boss and has a portion which is itself surrounded by the first mounting bracket segment. Likewise, an identical second vibration-isolation grommet surrounds the second end boss and has a portion which is itself surrounded by the second mounting bracket segment. A conventional vibration-isolation grommet is a grommet which consists of a monolithic and imperforate piece of elastomeric material.

What is needed is an improved grommet, and a motor assembly containing the improved grommet, which further reduces the transmission of vibration-induced noise.

SUMMARY OF THE INVENTION

The motor assembly of the present invention includes a motor, first and second mounting bracket segments, and monolithic and elastomeric first and second grommets. The motor includes a rotatable motor shaft and a stationary motor housing. The mounting bracket segments together define a mounting bracket which is spaced apart from the motor housing. The motor housing has longitudinally and opposingly protruding first and second end bosses generally coaxially aligned with the rotational axis of the motor shaft. The motor shaft has a free end longitudinally protruding through the first end boss. Each grommet includes inner and outer ring portions joined together by spaced-apart and generally-radially-extending spoke portions. The inner ring portion is disposed on the corresponding end boss. The outer ring portion has a hub and a circumferential flange radially projecting from the hub. Each mounting bracket segment has an opening, wherein the hub of the ring portion is positioned in the corresponding opening and wherein the circumferential flange of the outer ring portion longitudinally abuts the corresponding mounting bracket segment.

When the motor assembly of the present invention is an evaporator fan for a refrigeration appliance having an evaporator-fan mount, the evaporator fan is generally identical to the motor assembly described in the previous paragraph with differences as hereinafter noted. The motor is an evaporator-fan motor, and the mounting bracket is attachable to the evaporator-fan mount. Evaporator-fan blades are attached to the free end of the motor shaft longitudinally outward of the corresponding mounting bracket segment.

The grommet of the present invention includes an elastomeric inner ring portion, an elastomeric outer ring portion, and spaced-apart and generally-radially-extending elastomeric spoke portions joining together the inner and outer ring portions. The outer ring portion has a hub and a circumferential flange radially projecting from the hub. The inner and outer ring and spoke portions together define a monolithic unit having longitudinally opposing first and second ends. Only the inner ring portion extends longitudinally to the first end. The inner and outer ring and spoke portions extend longitudinally to the second end. The flange is located longitudinally between the first and second ends. The hub extends longitudinally from the second end to the flange. Preferably, the inner ring portion includes circumferentially spaced-apart and radially-inward projecting ribs extending longitudinally from the first end to the second end, and the flange includes spaced-apart nibs extending longitudinally towards the first end.

Several benefits and advantages are derived from the invention. The spoke portions provide both axial and torsional vibration isolation to further reduce the transmission of vibration-induced noise when compared to the torsional-only vibration isolation of a conventional vibration-isolation grommet. The ribs provide additional torsional vibration isolation. The nibs act as impact bumpers to reduce the chance of damage to the motor assembly components from forces that may be experienced by the motor assembly during shipping.

DETAILED DESCRIPTION OF THE INVENTION

Figure 1:
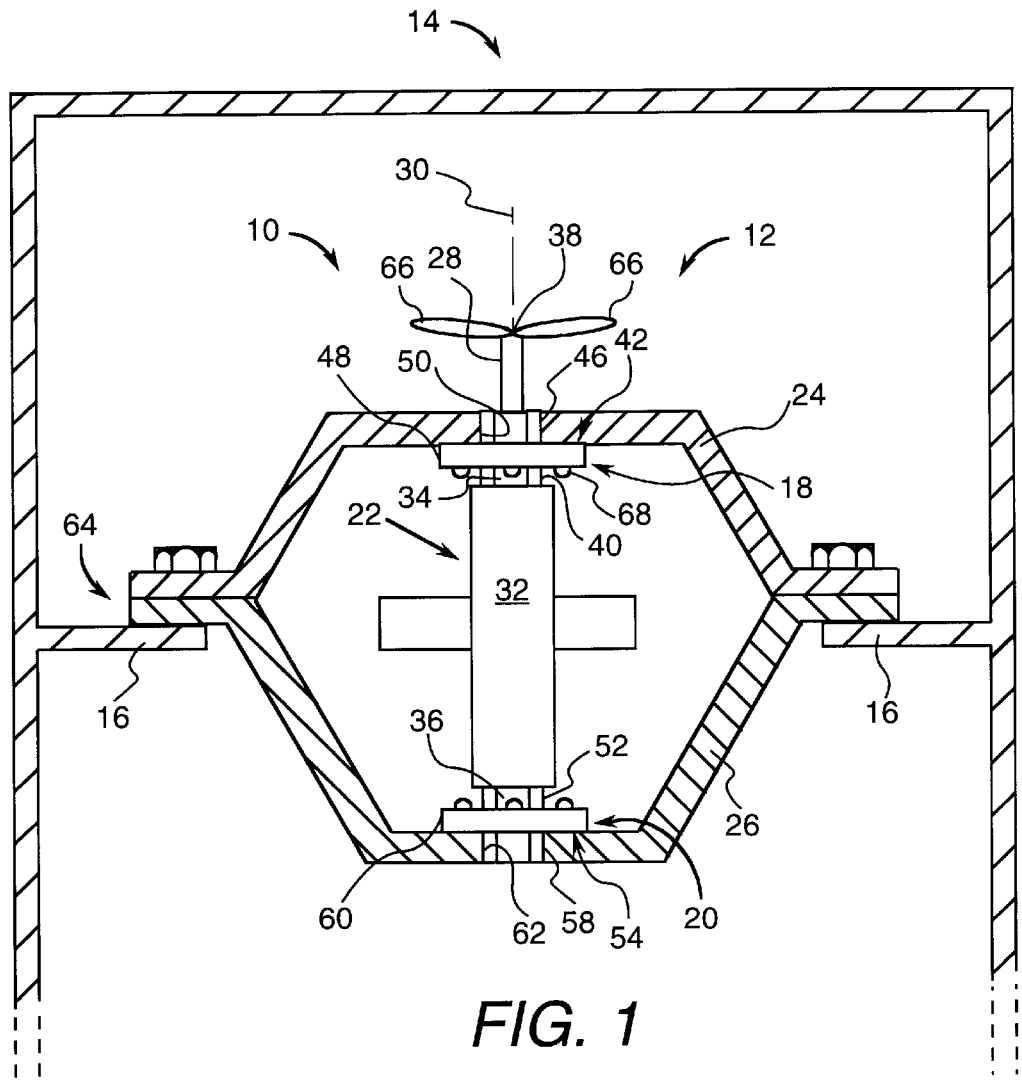
FIG. 1 is a schematic cross-sectional view of a preferred embodiment of the motor assembly of the present invention in the form of an evaporator fan which contains two exemplary grommets and which is shown in a refrigeration appliance having an evaporator-fan mount.
Figure 2:
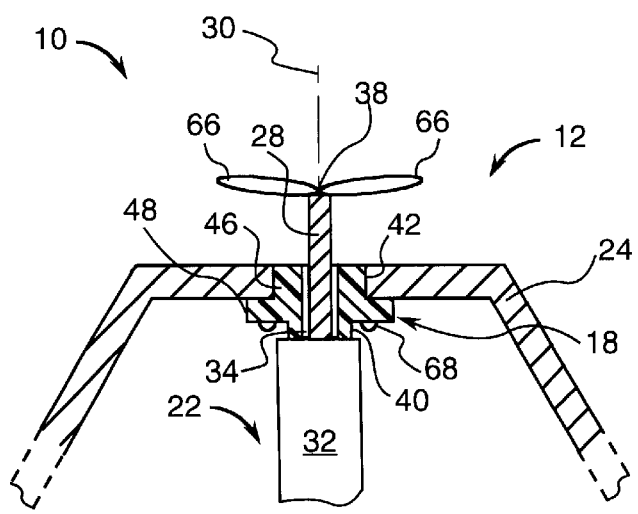
FIG. 2 is an enlarged view of a portion of the motor assembly of FIG. 1 containing one of the exemplary grommets which is shown in cross section.

Referring now to the drawings, FIGS. 1–5 schematically show a preferred embodiment of the present invention including a motor assembly 10, in the form of an evaporator fan 12 for a refrigeration appliance 14 having an evaporator-fan mount 16, and monolithic and elastomeric first and second grommets 18 and 20. The refrigeration appliance 14, only a portion of which is shown in FIG. 1, preferably includes, without limitation, a household side-by-side refrigerator-freezer. However, it is understood that the first and second grommets 18 and 20 of the present invention are not limited to those used in a motor assembly and that the motor assembly 10 of the present invention is not limited to those used as evaporator fans for refrigeration appliances. The motor assembly 10 of the present invention includes a motor 22, the monolithic and elastomeric first grommet 18, a first mounting bracket segment 24, the monolithic and elastomeric second grommet 20, and a second mounting bracket segment 26.

The motor 22 includes a rotatable motor shaft 28 having a rotational axis 30 and further includes a stationary motor housing 32 having longitudinally and opposingly protruding first and second end bosses 34 and 36. The first and second end bosses 34 and 36 are generally coaxially aligned with the rotational axis 30. The motor shaft 28 has a free end 38 longitudinally protruding through the first end boss 34.

The first grommet 18 includes a first inner ring portion 40, a first outer ring portion 42, and a plurality of spaced-apart and generally-radially-extending first spoke portions 44 joining together the first inner ring portion 40 and the first outer ring portion 42. The first inner ring portion 40 is disposed on the first end boss 34. The first outer ring portion 42 has a first hub 46 and a first circumferential flange 48 radially projecting from the first hub 46. The first spoke portions 44 provide both axial and torsional vibration isolation to further reduce the transmission of vibration-induced noise when compared to the torsional-only vibration isolation of a conventional vibration-isolation grommet.

The first mounting bracket segment 24 has a first opening 50. The first hub 46 of the first outer ring portion 42 is disposed in the first opening 50. The first circumferential flange 48 of the first outer ring portion 42 longitudinally abuts the first mounting bracket segment 24.

Figure 4:
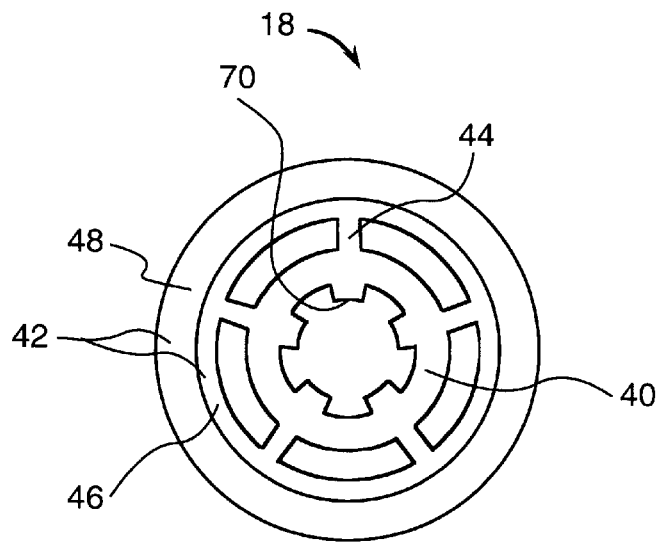
FIG. 4 is a top planar view of the grommet of FIG. 3 taken along lines 4—4 in FIG. 3.
Figure 5:
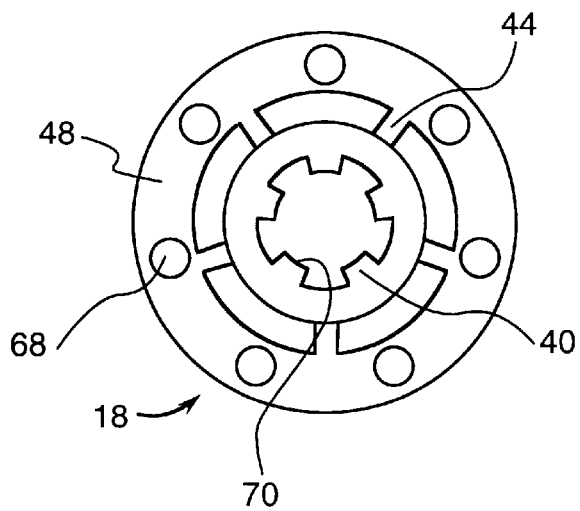
FIG. 5 is a bottom planar view of the grommet of FIG. 3 taken along lines 5—5 in FIG. 3.

The second grommet 20 includes a second inner ring portion 52, a second outer ring portion 54, and a plurality of spaced-apart and generally-radially-extending second spoke portions (preferably generally identical to the first spoke portions 44 shown in FIGS. 4 and 5) joining together the second inner ring portion 52 and the second outer ring portion 54. The second inner ring portion 52 is disposed on the second end boss 36. The second outer ring portion 54 has a second hub 58 and a second circumferential flange 60 radially projecting from the second hub 58. The second spoke portions provide both axial and torsional vibration isolation to further reduce the transmission of vibration-induced noise when compared to the torsional-only vibration isolation of a conventional vibration-isolation grommet.

The second mounting bracket segment 26 has a second opening 62. The second hub 58 of the second outer ring portion 54 is disposed in the second opening 62. The second circumferential flange 60 of the second outer ring portion 54 longitudinally abuts the second mounting bracket segment 26. The first and second mounting bracket segments 24 and 26 together define a mounting bracket 64 which is spaced apart from the motor housing 32.

In an exemplary enablement, the motor 22 is a fan motor for an appliance (such as the refrigeration appliance 14) having a fan-motor mount (such as the evaporator-fan mount 16). Here, the mounting bracket 64 is attachable to the fan-motor mount (such as the evaporator-fan mount 16). In this design, the motor assembly 10 also includes a plurality of fan blades 66 attached to the free end 38 of the motor shaft 28 longitudinally outward of the first mounting bracket segment 24.

Preferably, the first circumferential flange 48 of the first outer ring portion 42 of the first grommet 18 includes a multiplicity of spaced-apart and longitudinally-extending first nibs 68. The first nibs 68 extend longitudinally inward from the first opening 50 of the first mounting bracket segment 24. The first inner ring portion 40 of the first grommet 18 extends longitudinally further inward from the first opening 50 of the first mounting bracket segment 24 than do the first nibs 68. Preferably, the first nibs 68 have a generally hemispherical shape. The first nibs 68 act as impact bumpers to reduce the chance of damage to the motor assembly components from forces that may be experienced by the motor assembly 10 during shipping.

In a preferred construction, the first inner ring portion 40 of the first grommet 18 includes circumferentially spaced-apart, radially-inwardly projecting, and longitudinally-extending ribs 70 contacting the first end boss 34 of the motor housing 32. Preferably, the ribs 70 are the only areas of the first inner ring portion 40 which contact the first end boss 34. The ribs 70 provide additional torsional vibration isolation.

Desirably, the first and second end bosses 34 and 36 of the motor housing consist essentially of plastic, and the mounting bracket 64 consists essentially of metal. In an exemplary design, the second mounting bracket segment 26 is generally identical to, and disposed as a mirror image of, the first mounting bracket segment 24. Likewise, it is preferred that the second grommet 20 is generally identical to, and disposed as a mirror image of, the first grommet 18.

When the motor assembly 10 of the present invention is an evaporator fan 12 for a refrigeration appliance 14 having an evaporator-fan mount 16, the evaporator fan 12 is generally identical to the motor assembly 10 previously described with differences as hereinafter noted. The motor 22 is an evaporator-fan motor, and the mounting bracket 64 is attachable to the evaporator-fan mount 16. Evaporator-fan blades, such as fan blades 66, are attached to the free end 38 of the motor shaft 28 longitudinally outward of the corresponding (i.e., first) mounting bracket segment 24.

Figure 3:
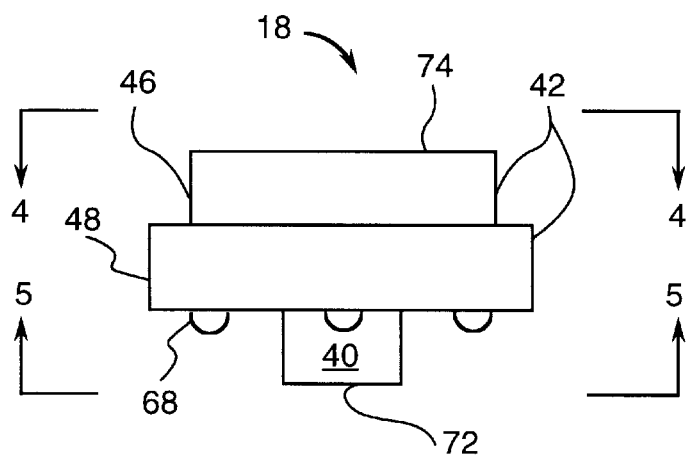
FIG. 3 is an enlarged elevational view the grommet of FIG. 2 which has been removed from the motor assembly.

Preferably, as seen in the preferred embodiment of FIGS. 3–5, the (first) grommet 18 can be described as including an elastomeric (first) inner ring portion 40, an elastomeric (first) outer ring portion 42, and a plurality of spaced-apart and generally-radially-extending elastomeric (first) spoke portions 44 joining together the (first) inner ring portion 40 and the (first) outer ring portion 42. The (first) outer ring portion 42 has a (first) hub 46 and a (first) circumferential flange 48 radially projecting from the (first) hub 46. The (first) inner ring portion 40, the (first) outer ring portion 42, and the (first) spoke portions 44 together define a monolithic unit having a longitudinal first end 72 and an opposing longitudinal second end 74. Only the (first) inner ring portion 40 extends longitudinally to the first end 72. The (first) inner ring portion 40, the (first) outer ring portion 42, and the (first) spoke portions 44 extend longitudinally to the second end 74. The (first) circumferential flange 48 is disposed longitudinally between the first and second ends 72 and 74. The (first) hub 46 extends longitudinally from the second end 74 to the (first) circumferential flange 48. Desirably, the (first) circumferential flange 48 of the (first) outer ring portion 42 includes a multiplicity of spaced-apart (first) nibs 68 extending longitudinally toward the first end 72, and the (first) inner ring portion 40 includes circumferentially spaced-apart and radially-inward projecting ribs 70, wherein the ribs 70 extend longitudinally from the first end 72 to the second end 74.

Applicants recognized that refrigerator evaporator fan noise comes from two primary sources. The first source is fan noise which is generated by the interaction of the fan blades and other areas of the evaporator fan with the airflow. This source consists of the blade passage frequency and its harmonics as well as broadband airflow noise. The second source is evaporator-fan motor noise which is generated by the mechanical vibration of the motor on its suspension. Motor noise can be related to running speed of the fan and driving line frequency. Both fan noise and motor noise can be transmitted through their supporting structures or radiate directly from the fan blade through an airborne path. Finally, both the structure-borne noise path and the airborne noise path can excite the refrigerator case and radiate unpleasant noise which is perceived by the customer.

The vibration generated by the fan and motor system is very complicated. The fan and motor vibration are coupled to each other through the motor shaft. In addition, due to the curvature of the fan blades, simultaneous torsional and axial excitation are often generated in the motor assembly (i.e., evaporator fan) and transmitted to the supporting structure, beginning with the evaporator-fan mount 16. This vibration can then be transmitted through the structure to the refrigerator case resulting in the radiation of significant audible noise. Thus, the grommet of the present invention is designed to isolate both torsional and axial vibration while also supporting the static loads of the motor and fan blades. Previously-used grommets isolated the vibration only in the torsional direction.

Preferably, the grommet of the present invention consists essentially of silicon rubber and includes inner and outer ring portions connected by six radial spoke portions. The inner and outer ring portions support the motor and mounting bracket, respectively. The connecting spoke portions provide support for the motor assembly between the inner and outer ring portions while also providing significant isolation of both the torsional and axial vibrations of the motor assembly from the mounting brackets. The preferably eight nibs provide an increased level of stiffness for the purpose of shipping protection.

Tests of the present invention were conducted on both a fan test rig and in a side-by-side refrigerator to verify the effect of Applicants' grommet on vibration isolation. The use of the grommet of the present invention resulted in a generally 33 dB reduction at the first motor tone and a generally 36 dB reduction at the blade passage frequency on the vibration level measured on the bracket near the mounting position. The grommet of the present invention was used as part of a package of solutions which achieved a generally 8 dBA noise reduction on the refrigerator.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A motor assembly comprising:

a) a motor including a rotatable motor shaft having a rotational axis and further including a stationary motor housing having longitudinally and opposingly protruding first and second end bosses generally coaxially aligned with said rotational axis, wherein said motor shaft has a free end longitudinally protruding through said first end boss;

b) a monolithic and elastomeric first grommet including a first inner ring portion, a first outer ring portion, and a plurality of spaced-apart and generally-radially-extending first spoke portions joining together said first inner ring portion and said first outer ring portion, wherein said first inner ring portion is disposed on said first end boss and wherein said first outer ring portion has a first hub and a first circumferential flange radially projecting from said first hub;

c) a first mounting bracket segment having a first opening, wherein said first hub of said first outer ring portion is disposed in said first opening and wherein said first circumferential flange of said first outer ring portion longitudinally abuts said first mounting bracket segment;

d) a monolithic and elastomeric second grommet including a second inner ring portion, a second outer ring portion, and a plurality of spaced-apart and generally-radially-extending second spoke portions joining together said second inner ring portion and said second outer ring portion, wherein said second inner ring portion is disposed on said second end boss and wherein said second outer ring portion has a second hub and a second circumferential flange radially-projecting from said second hub; and e) a second mounting bracket segment having a second opening, wherein said second hub of said second outer ring portion is disposed in said second opening and wherein said second circumferential flange of said second outer ring portion longitudinally abuts said second mounting bracket segment, and wherein said first and second mounting bracket segments together define a mounting bracket which is spaced apart from said motor housing.

2. The motor assembly of claim 1, wherein said motor is a fan motor for an appliance having a fan-motor mount, and wherein said mounting bracket is attachable to said fan-motor mount, and also including a plurality of fan blades attached to said free end of said motor shaft longitudinally outward of said first mounting bracket segment.

3. The motor assembly of claim 2, wherein said first inner ring portion includes circumferentially spaced-apart, radially-inward projecting, and longitudinally-extending ribs contacting said first end boss of said motor housing.

4. The motor assembly of claim 3, wherein said second mounting bracket segment is generally identical to, and disposed as a mirror image of, said first mounting bracket segment.

5. The motor assembly of claim 4, wherein said second grommet is generally identical to, and disposed as a mirror image of, said first grommet.

6. The motor assembly of claim 1, wherein said first circumferential flange of said outer ring portion includes a multiplicity of spaced-apart and longitudinally-extending first nibs, wherein said first nibs extend longitudinally inward from said first opening, and wherein said first inner ring portion extends longitudinally further inward from said first opening than do said first nibs.

7. An evaporator fan for a refrigeration appliance having an evaporator-fan mount, said evaporator fan comprising:

a) an evaporator-fan motor including a rotatable motor shaft having a rotational axis and further including a stationary motor housing having longitudinally and opposingly protruding first and second end bosses generally coaxially aligned with said rotational axis, wherein said motor shaft has a free end longitudinally protruding through said first end boss;

b) a monolithic and elastomeric first grommet including a first inner ring portion, a first outer ring portion, and a plurality of spaced-apart and generally-radially-extending first spoke portions joining together said first inner ring portion and said first outer ring portion, wherein said first inner ring portion is disposed on said first end boss and wherein said first outer ring portion has a first hub and a first circumferential flange radially projecting from said first hub;

c) a first mounting bracket segment having a first opening, wherein said first hub of first outer ring portion is disposed in said first opening and wherein said first circumferential flange of said first outer ring portion longitudinally abuts said first mounting bracket segment;

d) a monolithic and elastomeric second grommet including a second inner ring portion, a second outer ring portion, and a plurality of spaced-apart and generally-radially-extending second spoke portions joining together said second inner ring portion and said second outer ring portion, wherein said second inner ring portion is disposed on said second end boss and wherein said second outer ring portion has a second hub and a second circumferential flange radially-projecting from said second hub;

e) a second mounting bracket segment having a second opening, wherein said second hub of said second outer ring portion is disposed in said second opening and wherein said second circumferential flange of said second outer ring portion longitudinally abuts said second mounting bracket segment, and wherein said first and second mounting bracket segments together define a mounting bracket which is spaced apart from said motor housing and which is attachable to said evaporator-fan mount; and f) a plurality of evaporator-fan blades attached to said free end of said motor shaft longitudinally outward of said first mounting bracket segment.

8. The evaporator fan of claim 7, wherein said first circumferential flange of said first outer ring portion includes a multiplicity of spaced-apart and longitudinally-extending first nibs, wherein said first nibs extend longitudinally inward from said first opening, and wherein said first inner ring portion extends longitudinally further inward from said first opening than do said first nibs.

9. The evaporator fan of claim 8, wherein said first inner ring portion includes circumferentially spaced-apart, radially-inward projecting, and longitudinally-extending ribs contacting said first boss of said motor housing.

10. The evaporator fan of claim 9, wherein said second mounting bracket segment is generally identical to, and disposed as a mirror image of, said first mounting bracket segment, and wherein said second grommet is generally identical to, and disposed as a mirror image of, said first grommet.

11. A grommet comprising:

a) an elastomeric inner ring portion;

b) an elastomeric outer ring portion having a hub and a circumferential flange radially projecting from said hub, and c) a plurality of spaced-apart and generally-radially-extending elastomeric spoke portions joining together said inner ring portion and said outer ring portion, wherein said inner ring portion, said outer ring portion, and said spoke portions together define a monolithic unit having a longitudinal first end and an opposing longitudinal second end, wherein only said inner ring portion extends longitudinally to said first end, wherein said inner ring portion, said outer ring portion, and said spoke portions extend longitudinally to said second end, wherein said circumferential flange is disposed longitudinally between said first and second ends, and wherein said hub extends longitudinally from said second end to said circumferential flange.

12. The grommet of claim 11, wherein said circumferential flange includes a multiplicity of spaced-apart nibs extending longitudinally toward said first end.

13. The grommet of claim 12, wherein said inner ring portion includes circumferentially spaced-apart and radially-inward projecting ribs, said ribs extending longitudinally from said first end to said second end.

* * * * *